(12) United States Patent
Bhatia et al.

(10) Patent No.: US 9,946,502 B2
(45) Date of Patent: Apr. 17, 2018

(54) USING DEVICE IDENTIFICATION INFORMATION FOR PAYMENT VIA A PRINTER

(71) Applicant: Hewlett-Packard Development Company, L.P., Houston, TX (US)

(72) Inventors: Rajesh Bhatia, Karnataka (IN); Harish B Kamath, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/431,285

(22) PCT Filed: Sep. 28, 2012

(86) PCT No.: PCT/IN2012/000653
§ 371 (c)(1),
(2) Date: Mar. 25, 2015

(87) PCT Pub. No.: WO2014/049599
PCT Pub. Date: Apr. 3, 2014

(65) Prior Publication Data
US 2015/0248264 A1    Sep. 3, 2015

(51) Int. Cl.
*G06F 3/12* (2006.01)
*G07F 17/42* (2006.01)
(Continued)

(52) U.S. Cl.
CPC .......... *G06F 3/1292* (2013.01); *G06F 3/1222* (2013.01); *G06F 3/1238* (2013.01); *G06Q 20/123* (2013.01); *G06Q 20/18* (2013.01); *G06Q 20/24* (2013.01); *G06Q 20/327* (2013.01); *G06Q 20/3278* (2013.01); *G06Q 20/385* (2013.01);
(Continued)

(58) Field of Classification Search
CPC combination set(s) only.
See application file for complete search history.

(56) References Cited

U.S. PATENT DOCUMENTS

2002/0161831 A1* 10/2002 Nakaoka ............... G06F 3/1204
                                                            709/203
2004/0030641 A1    2/2004 Hasumi et al.
(Continued)

FOREIGN PATENT DOCUMENTS

CN           1465025 A      12/2003
CN        201600697 U       10/2010
(Continued)

OTHER PUBLICATIONS

English language machine translation of JP 2003-345896 to Oda et al.*
(Continued)

*Primary Examiner* — Henok A Shiferaw
(74) *Attorney, Agent, or Firm* — HP Inc. Patent Department

(57) ABSTRACT

A technique performed by a printer includes receiving identification information from a computing device. The identification information may be sent to a server, such as a content management server. The identification information can be used for payment. Payment confirmation, authorization to provide content, or content itself may be received from the server.

19 Claims, 3 Drawing Sheets

(51) Int. Cl.
    *G06Q 20/12*     (2012.01)
    *G06Q 20/18*     (2012.01)
    *G06Q 20/32*     (2012.01)
    *G06Q 20/38*     (2012.01)
    *G06Q 20/42*     (2012.01)
    *G06Q 20/24*     (2012.01)
    *G06Q 20/40*     (2012.01)
    *G06Q 30/06*     (2012.01)

(52) U.S. Cl.
    CPC .......... *G06Q 20/40* (2013.01); *G06Q 20/425* (2013.01); *G06Q 30/06* (2013.01); *G07F 17/42* (2013.01)

(56) References Cited

U.S. PATENT DOCUMENTS

| | | | |
|---|---|---|---|
| 2004/0133525 A1* | 7/2004 | Singh | G06Q 30/06 705/77 |
| 2004/0249733 A1 | 12/2004 | Clough | |
| 2005/0117931 A1* | 6/2005 | Fukuda | G03G 21/02 399/79 |
| 2005/0177517 A1 | 8/2005 | Leung et al. | |
| 2005/0246253 A1 | 11/2005 | Barthelemy | |
| 2007/0035762 A1 | 2/2007 | Wilsher et al. | |
| 2010/0082485 A1 | 4/2010 | Lin et al. | |
| 2011/0078031 A1* | 3/2011 | Mardikar | G06Q 20/20 705/17 |

FOREIGN PATENT DOCUMENTS

| | | |
|---|---|---|
| CN | 102467788 A | 5/2012 |
| JP | 2003345896 A * | 12/2003 |
| WO | WO-2009107102 A2 | 9/2009 |

OTHER PUBLICATIONS

The International Bureau of WIPO. International Preliminary Report on Patentability. Date of mailing Apr. 9, 2015. Application No. PCT/IN2012/000653, Filing date Sep. 28, 2012.

International Search Report & Written Opinion received in PCT Application No. PCT/IN2012/000653, dated Jul. 11, 2013, 10 pages.

European Patent Office, Extended European Search Report, European Patent Application No. 12885778.6, dated Jan. 27, 2016, 7 pages.

* cited by examiner

USING DEVICE IDENTIFICATION INFORMATION FOR PAYMENT VIA A PRINTER

BACKGROUND

Printers are increasingly being developed with new and various features. For example, many printers have a connection to the Internet. Additionally, many printers provide the option of delivering content for a fee. For example, images, articles, or the like can be selected and printed. Additionally, special print applications can be delivered to the printer. To facilitate the selection and delivery of content, the printer can connect to a web server, such as a content management server.

BRIEF DESCRIPTION OF DRAWINGS

The following detailed description refers to the drawings, wherein.

DETAILED DESCRIPTION

According to an embodiment, a printer can receive a request for content from a user, For example, the user can request the content via a print application on the user's computing device, such as a smart phone or tablet computer. The printer and computing device can be in close proximity, such that communication between the devices is via Near Held Communication (NFC). The printer can also receive identification information from the user's computing device. The identification information can be identification information of the device, such as an IMEI or a SIM number.

The printer can send the identification information to a server supporting the printer, such as a content management server. As used herein, a content manager or content management server is one or more computers, such as servers, that provide services to a printer. For example, the content manager can serve as a rendering pipeline, a print application server, a content hosting and management server, and a payment server. In some examples, each of these services can be implemented by a different computer or group of computers that make up the content manager.

The identification information of the user's device can be used to facilitate payment for the requested content. For example, the content management server can provide the device identification information to a service provider (e.g., phone service provider) associated with the user's device. In one example, the user may have prepaid credit with the service provider that can be applied to payment for the requested content. In another example, the user may have credit card information on file with the service provider that can be provided to the content manager to facilitate payment. After payment has been effected, payment confirmation may be received at the printer from the content provider. The printer may then provide the requested content to the user. For example, the printer may print the content item.

As a result, an easy, user-friendly payment process may be provided to the user. For example, the user needn't worry about entering credit card information into a user interface of the printer, which could be a security risk (such as if the printer is a public printer), might leave the user feeling unsettled, or simply might be viewed as a hassle. Additionally, the user needn't go through the hassle of entering credit card or other payment information into the print application of the user's computing device. Further details of this embodiment and associated advantages, as well as of other embodiments, will be discussed in more detail below with reference to the drawings.

Figure 1:
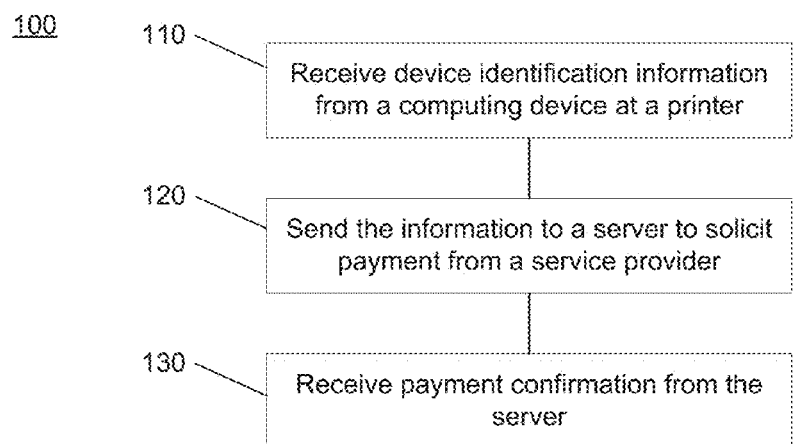
FIG. 1 illustrates a method of using device identification information for payment, according to an example.
Figure 2:
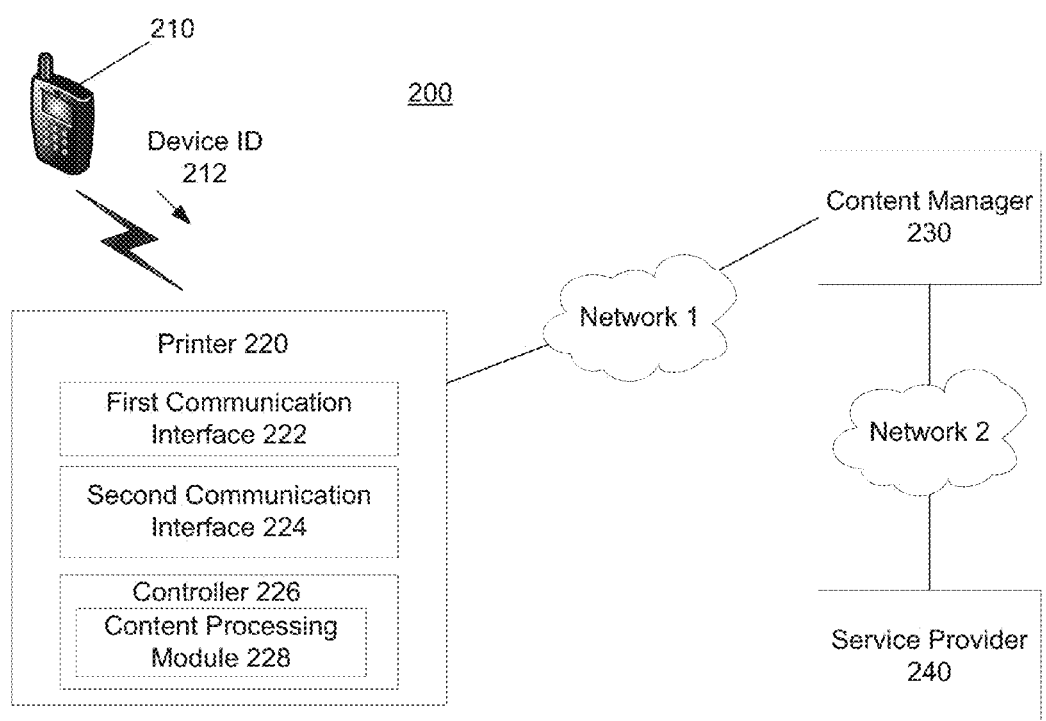
FIG. 2 illustrates a use case in which device identification information is used for payment, according to an example.

Referring now to the drawings, FIG. 1 illustrates a method of using device identification information for payment, according to an example. In addition, FIG. 2 illustrates a use case in which device identification information is used for payment, according to an example, Although execution of method 100 is described below with reference to the systems and devices depicted in FIG. 2, other suitable systems and devices for execution of method 100 can be used, such as shown in FIGS. 6. Method 100 may be implemented in the form of executable instructions stored on a machine-readable medium or in the form of electronic circuitry. A processor, a machine-readable storage medium, other control logic, or a combination thereof can be used to execute method 100.

Method 100 may begin at 110, where a printer can receive device identification information from a personal computing device. For example, printer 220 may receive device ID 212 from personal computing device 210. Printer 220 may be any of various printers, such as an inkjet printer or a laser jet printer. Printer 220 can include a first communication interface 222, a second communication interface 224, and a controller 226.

Communication interfaces 222 and 224 may be used to connect to and communicate with multiple devices. The communication interfaces may include, for example, a transmitter that may convert electronic signals to radio frequency (RF) signals and/or a receiver that may convert RF signals to electronic signals. Alternatively, the communication interfaces may include a transceiver to perform functions of both the transmitter and receiver. The communication interfaces may further include or connect to an antenna assembly to transmit and receive the RF signals over the air. The communication interfaces may further communicate using Near Field Communication, Bluetooth, or the like. The communication interfaces may communicate with a network, such as a wireless network, a cellular network, a local area network, a wide area network, a telephone network, an intranet, the Internet, or a combination thereof. The communication interfaces may also include an Ethernet connection, a USB connection, or other direct connection to a network or other devices. In some examples, the communication interfaces may be implemented by the same hardware and/or machine-readable instructions.

Controller 226 may include a processor and a memory for implementing machine readable instructions. The processor may include at least one central processing unit (CPU), at least one semiconductor-based microprocessor, at least one digital signal processor (DSP) such as a digital image processing unit, other hardware devices or processing elements suitable to retrieve and execute instructions stored in memory, or combinations thereof. The processor can include single or multiple cores on a chip, multiple cores across multiple chips, multiple cores across multiple devices, or combinations thereof. The processor may fetch, decode, and execute instructions from memory to perform various functions. As an alternative or in addition to retrieving and executing instructions, the processor may include at least one integrated circuit (IC), other control logic, other electronic circuits, or combinations thereof that include a number of electronic components for performing various tasks or functions.

Controller 226 may include memory, such as a machine-readable storage medium. The machine-readable storage medium may be any electronic, magnetic, optical, or other physical storage device that contains or stores executable instructions. Thus, the machine-readable storage medium may comprise, for example, various Random Access Memory (RAM), Read Only Memory (ROM), flash memory, and combinations thereof. For example, the machine-readable medium may include a Non-Volatile Random Access Memory (NVRAM), an Electrically Erasable Programmable Read-Only Memory (EEPROM), a storage drive, a NAND flash memory, and the like. Further, the machine-readable storage medium can be computer-readable and non-transitory. Additionally, printer 220 may include one or more machine-readable storage media separate from the controller.

The content processing module 228 may include software modules, one or more machine-readable media for storing the software modules, and one or more processors for executing the software modules. A software module may be a computer program comprising machine-executable instructions. Content processing module 228 may be used to perform method 100, methods 300 and 400 as described later, and any other printer functionality described herein.

First communication interface 222 can be used to communicate with personal computing device 210. Personal computing device 210 may be any of various computing devices. For example, personal computing device 210 may be a smart phone, a tablet computer, a slate computer, or the like. Printer 220 can receive device ID 212 from personal computing device 210. In an example, personal computing device 210 can transmit device ID 212 to printer 220 using a print application executing on personal computing device 210.

Device ID 212 may be device identification information, to wit, identifying information of the personal computing device 210. For example, the device identification information can be an International Mobile Equipment Identity (IMEI) number or a Subscriber Identity Module (SIM) number. The device identification information can be identification information that is not readily publically available. The device identification information can be devoid of a user identification (ID) and/or password.

Method 100 may proceed to 120, where the device identification information is sent to a content manager associated with the printer. The device identification information may be sent to the content manager to solicit payment or payment information from a service provider associated with the personal computing device.

For example, printer 220 may send device ID 212 to content manager 230 via second communication interface 224. Second communication interface 224 may be used to communicate with content manager 230 over Network 1. Network 1 may be the Internet. Alternatively, Network 1 may be a private network or a combination of a private network and the Internet.

Content manager 230 may include one or more server computers. Content manager 230 may provide services to a printer. For example, the content manager can serve as a rendering pipeline, a print application server, a content hosting and management server, and a payment server. In some examples, each of these services can be implemented by a different computer or group of computers that make up the content manager 230.

Content manager 230 may provide content and support to printer 220. For example, content manger 230 may store content items, such as images, texts, print applications, and the like, which can be delivered to printer 220 or personal computing device 210 over network 1. Content manager 230 may charge a fee for providing the content items to printer 220 or personal computing device 210. In this example, it can be assumed that personal computing device 210 has requested a content item. To effect payment, personal computing device 210 has transmitted device ID 212 to printer 220. Printer 220 has thus passed the device ID 212 to content manager 230.

Content manager 230 can used device ID 212 to solicit payment or payment information. For example, content manager 230 can send the device ID 212 to service provider 240. As depicted, content manager 230 can send the device ID 212 to service provider 240 over Network 2. Network 2 may the same network or a similar network as Network 1. For example, Network 2 may include the Internet and/or a private network.

Service provider 240 may include one or more server computers. Service provider 240 may be associated with personal computing device 210. For example, service provider 240 may provide a service for personal computing device 210 for the benefit of the user/owner of the device. For instance, service provider 240 may be a cellular network provider or an Internet service provider.

Due to the relationship between the personal computing device 210 and service provider 240, the user/owner of personal computing device 210 may have prepaid credit with service provider 240. In this case, providing device ID 212 to service provider 240 may indicate user authorization for service provider 240 to provide payment to content manger 230 from the prepaid credit. Alternatively, the user/owner of personal computing device 210 may have payment information, such as credit card information or bank account information, on file with service provider 240. For instance, this information may be stored in a database with service provider 240. In this case, providing device ID 212 to service provider 240 may indicate user authorization for service provider 240 to provide the payment information to content manager 230. Content manager 230 may then use the payment information to effect payment.

At 130, payment confirmation can be received from the content manager. For example, after successful payment, content manager 230 can send a confirmation to printer 220 via Network 1. Printer 220 can receive this confirmation via second communication interface 224.

Figure 3:
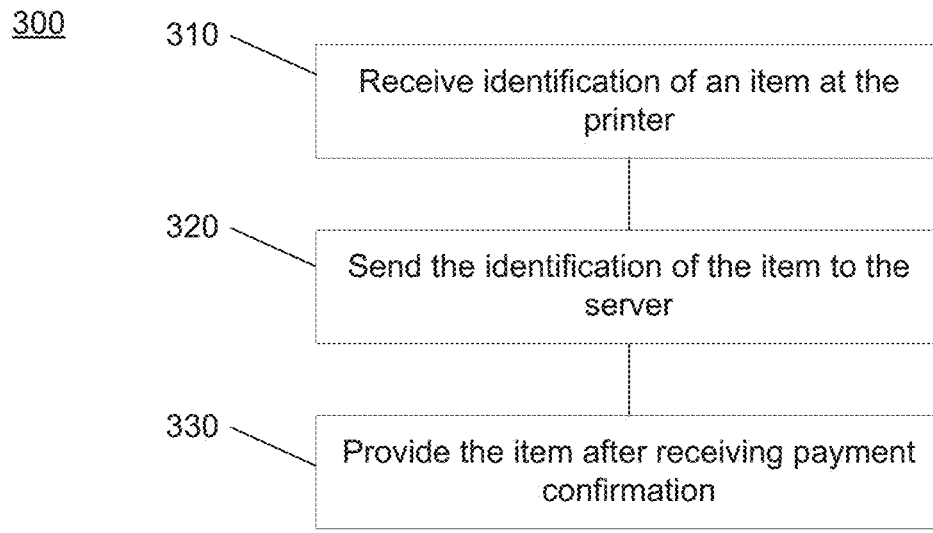
FIG. 3 illustrates a method of purchasing a content item, according to an example.

FIG. 3 illustrates a method of purchasing a content item, according to an example. Method 300 may be combined with method 100. At 310, the printer can receive an identification of a content item. For example, printer 220 can receive a request for content from personal computing device 210 via first communication interface 222. The request for content can identify a content item that the user of personal computing device 210 desires to purchase. The content item may be a content item made available for purchase by content manager 230.

At 320, the identification of the content item may be sent to the content manager along with the device identification information. For example, printer 220 can send the request for content to content manager 230 via second communication interface 224. Content manager 230 may determine the price of the content item and may request payment or payment information from service provider 240, as described previously. Upon receiving payment, content manager 230 may provide payment confirmation to printer 220 and may deliver the requested content item. For example, if the requested content item is an image or text, printer 220 may print the content item. If the requested content item is a print application, printer 220 may install the print application on printer 220 itself or may deliver it to personal computing device 210, as appropriate.

Figure 4:
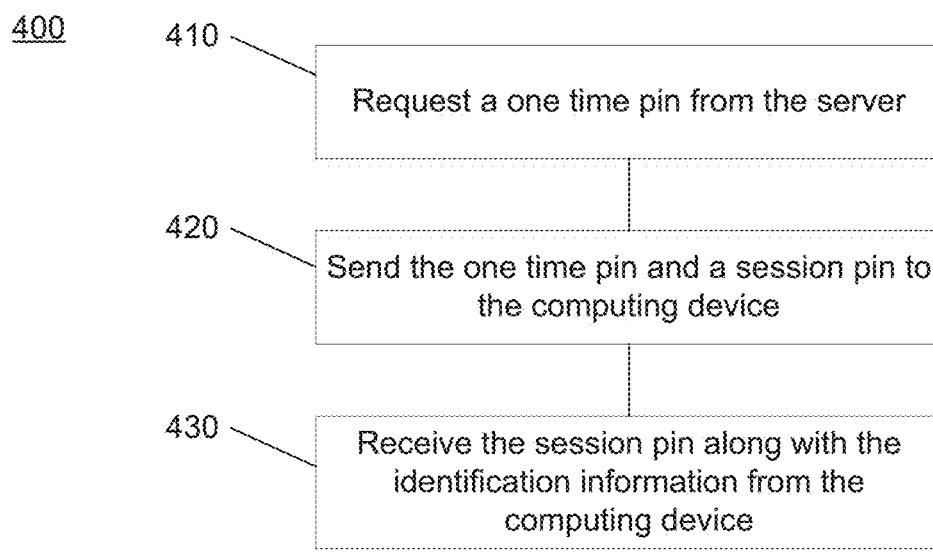
FIG. 4 illustrates a method of performing a session verification, according to an example.

FIG. 4 illustrates a method of performing a session verification, according to an example. At 410, the printer can request a one time PIN from the content manager. For example, printer 220 may request a one time PIN from content manager 230 via second communication interface 224. The one time PIN may be requested for verification purposes for a payment transaction. Content manager 230 may provide the one time PIN to the printer 220.

At 420, the printer can send the one time PIN to the personal computing device. The printer may also send a session PIN that identifies the current communication session between the printer and the device. For example, printer 220 can provide the one time PIN and the session PIN to personal computing device 210 via first communication interface 222. In an example, personal computing device 210 can confirm the authenticity of the one time PIN with content manager 230 to verify that printer 220 is authorized to receive the device identification information. In one example, the content manager 230 can simply reply with a message that the one time PIN is valid. Alternatively, the personal computing device can also provide identification information of printer 220 to content manager 230 along with the one time PIN to verify that both the PIN and the source of the PIN are valid.

At 430, the printer can receive the session PIN along with the device identification information from the computing device. For example, printer 220 can receive the session PIN and device ID 212 from personal computing device 210.

Figure 5:
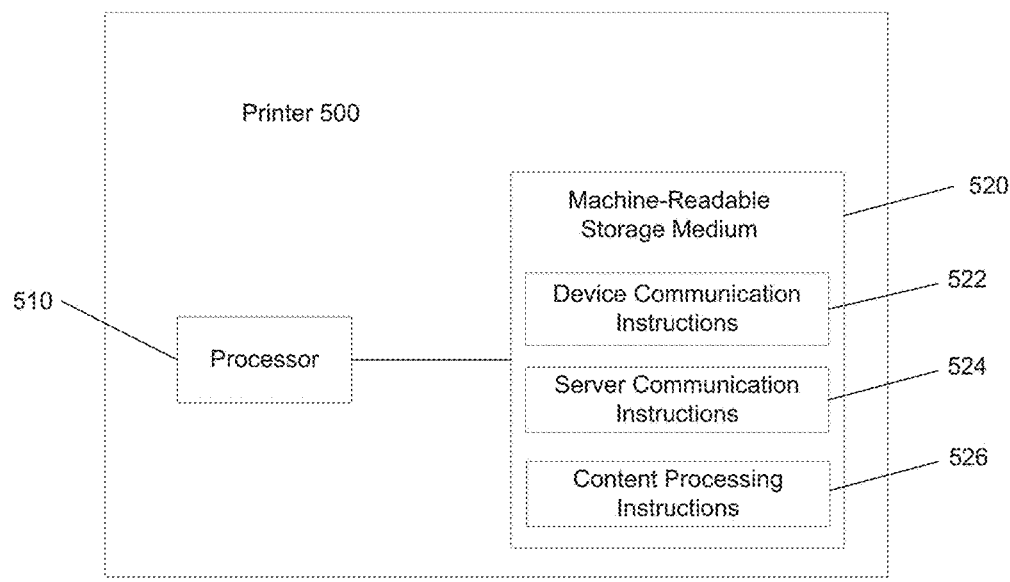
FIG. 5 illustrates a computer-readable medium for using device identification information for payment, according to an example.

FIG. 5 illustrates a computer-readable medium for using device identification information for payment, according to an example. Printer 500 may be any of various printers, and may be similar to printer 220.

Processor 510 may be at least one central processing unit (CPU), at least one semiconductor-based microprocessor, other hardware devices or processing elements suitable to retrieve and execute instructions stored in machine-readable storage medium 520, or combinations thereof. Processor 510 can include single or multiple cores on a chip, multiple cores across multiple chips, multiple cores across multiple devices, or combinations thereof. Processor 510 may fetch, decode, and execute instructions 522, 524, 526, among others, to implement various processing. As an alternative or in addition to retrieving and executing instructions, processor 510 may include at least one integrated circuit (IC), other control logic, other electronic circuits, or combinations thereof that include a number of electronic components for performing the functionality of instructions 522, 524, 526. Accordingly, processor 510 may be implemented across multiple processing units and instructions 522, 524, 526 may be implemented by different processing units in different areas of printer 500.

Machine-readable storage medium 520 may be any electronic, magnetic, optical, or other physical storage device that contains or stores executable instructions. Thus, the machine-readable storage medium may comprise, for example, various Random Access Memory (RAM), Read Only Memory (ROM), flash memory, and combinations thereof. For example, the machine-readable medium may include a Non-Volatile Random Access Memory (NVRAM), an Electrically Erasable Programmable Read-Only Memory (EEPROM), a storage drive, a NAND flash memory, and the like. Further, the machine-readable storage medium 520 can be computer-readable and non-transitory, Machine-readable storage medium 520 may be encoded with a series of executable instructions for managing processing elements.

The instructions 522, 524, 526, when executed by processor 510 (e.g., via one processing element or multiple processing elements of the processor) can cause processor 510 to perform processes, for example, the processes depicted in FIGS. 1, 3, and 4. Furthermore, printer 500 may be similar to printer 220 and may have similar functionality and be used in similar ways, as described above.

Device communication instructions 522 can cause processor 510 to receive identification information and a request for content from a computing device. The computing device may be similar to personal computing device 210. In addition, the identification information may be similar to device ID 212. For example, the identification information may include at least one of an IMEI and a SIM number associated with the computing device. The request for content can identify a content item. The content item can be any of various content items, such as an image, a text, or a print application.

Server communication instructions 524 can cause processor 510 to send the identification information and request for content to a content management server. The identification information can be used by the content management server for payment for the requested content. The content management server may be similar to content manager 230. The content management server can used the identification information to solicit payment or payment information from a service provider associated with the computing device. For example, the service provider may be similar to service provider 240.

Content processing instructions 526 can cause processor 510 to receive the requested content from the content management server. For example, after successful payment, the content management server may send the requested content or authorization to provide the requested content to the printer.

What is claimed is:

1. A method performed by a printer, comprising:
receiving, by the printer, device identification information of a personal computing device from the personal computing device;
sending, by the printer over a network, the device identification information of the personal computing device to a content manager associated with the printer, the device identification information sent by the printer to the content manager triggering the content manager to request payment from a service provider associated with the personal computing device;
receiving, by the printer from the content manager over the network, payment confirmation of receipt of the payment requested in response to the device identification information sent by the printer to the content manager, and a content item associated with the payment confirmation; and
in response to receiving the payment confirmation from the content manager, printing the content item.

2. The method of claim 1, wherein the personal computing device is a smart phone or tablet computer.

3. The method of claim 1, further comprising:
receiving, by the printer, an identification of the content item from the personal computing device; and
sending, by the printer, the identification of the content item to the content manager along with the device identification information.

4. The method of claim 1, further comprising:
receiving, by the printer, an identification of a print application; and
sending, by the printer, the print application to the personal computing device after receiving the payment confirmation from the content manager.

5. The method of claim 1, wherein a user of the personal computing device has prepaid credit with the service provider, the device identification information being used to authorize the payment at the service provider.

6. The method of claim 1, wherein a user of the personal computing device has credit card information on file with the service provider, the device identification information being used to authorize the service provider to provide the credit card information to the content manager as the payment.

7. The method of claim 1, further comprising:
performing a verification comprising (1) requesting a one time PIN from the content manager, (2) sending the one time PIN and a session PIN to the personal computing device, and (3) receiving the session PIN along with the device identification information from the personal computing device.

8. The method of claim 7, wherein the personal computing device is configured to verify the one time PIN with the content manager.

9. The method of claim 1, wherein the device identification information is at least one selected from among an IMEI and a SIM number.

10. The method of claim 1, wherein the device identification information is received from a print application on the personal computing device.

11. A printer, comprising:
a first communication interface to communicate with a user's computing device;
a second communication interface to communicate with a content management server over a network; and
a controller to:
receive identification information of the computing device and a request for content from the computing device, the identification information to facilitate payment for the requested content from a service provider associated with the user's computing device;
send the identification information and the request for content to the content management server, the sending of the identification information and the request for content causing the content management server to request payment from the service provider for the requested content;
receive, from the content management server, a payment confirmation of the payment requested by the content management server in response to the identification information sent by the printer to the content management server; and
print the content in response to the payment confirmation.

12. The printer of claim 11, wherein the identification information comprises at least one selected from among an IMEI and a SIM number.

13. The printer of claim 11, wherein the identification information does not include a user ID or user password.

14. A non-transitory computer-readable storage medium comprising instructions that, when executed by a processor of a printer, cause the processor to:
receive identification information and a request for content from a computing device, the identification information comprising at least one selected from among an IMEI and a SIM number associated with the computing device;
send, over a network, the identification information and the request for content to a content management server, the identification information to trigger the content management server to request payment from a service provider for the requested content; and
receive, over the network from the content management server, the requested content and payment confirmation of receipt of the payment requested by the content management server in response to the identification information sent by the printer to the content management server; and
print the requested content in response to the payment confirmation received from the content management server.

15. The method of claim 1, wherein the printer is separate from each of the personal computing device and the content manager, the content manager comprising a computer.

16. The printer of claim 11, wherein the printer is separate from each of the user's computing device and the content management server.

17. The non-transitory computer-readable storage medium of claim 14, wherein the requesting of payment at the content management server uses a prepaid credit or credit card stored at the service provider.

18. The non-transitory computer-readable storage medium of claim 14, wherein the printer is separate from each of the user's computing device and the content management server.

19. The non-transitory computer-readable storage medium of claim 14, wherein the instructions when executed cause the printer to print the requested content in response to the payment confirmation.

* * * * *